United States Patent
Shogome

(10) Patent No.: US 12,504,815 B2
(45) Date of Patent: Dec. 23, 2025

(54) MANAGEMENT SYSTEM CAPABLE OF REALIZING SMOOTH INTERACTIVE COMMUNICATION IN VIRTUAL SPACE, CONTROL METHOD, AND STORAGE MEDIUM

(71) Applicant: CANON KABUSHIKI KAISHA, Tokyo (JP)

(72) Inventor: Kohei Shogome, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/944,339

(22) Filed: Nov. 12, 2024

(65) Prior Publication Data

US 2025/0165065 A1     May 22, 2025

(30) Foreign Application Priority Data

Nov. 17, 2023   (JP) .................................. 2023-195829

(51) Int. Cl.
*G06F 3/01*     (2006.01)
*G10L 15/22*    (2006.01)

(52) U.S. Cl.
CPC .............. *G06F 3/013* (2013.01); *G10L 15/22* (2013.01)

(58) Field of Classification Search
CPC ........... G06F 3/013; G06F 3/011; G10L 15/22
See application file for complete search history.

(56) References Cited

U.S. PATENT DOCUMENTS

| | | | |
|---|---|---|---|
| 2016/0077547 A1* | 3/2016 | Aimone | A61B 3/113 345/8 |
| 2019/0095164 A1* | 3/2019 | Yamaura | G10L 15/26 |
| 2020/0209624 A1* | 7/2020 | Sztuk | G06F 3/013 |

FOREIGN PATENT DOCUMENTS

| | | |
|---|---|---|
| JP | 2014-225801 A | 12/2014 |
| JP | 2015-207806 A | 11/2015 |
| JP | 2022-515978 A | 2/2022 |

\* cited by examiner

*Primary Examiner* — Matthew A Eason
*Assistant Examiner* — Chayce R Bibbee
(74) *Attorney, Agent, or Firm* — VENABLE LLP

(57) ABSTRACT

A management system that provides virtual space contents in which a plurality of users can participate. Information on a line of sight of each user in a virtual space, who participates in the virtual space contents, is acquired. Information on a speech of each user in the virtual space, who participates in the virtual space contents, is acquired. A conversation status between users in the virtual space is determined based on the speech information. A notification for assisting a user participating in the virtual space contents in promotion of conversation is provided based on the information on the line of sight and the conversation status.

10 Claims, 21 Drawing Sheets

*FIG. 5*

| USER | SIGHT LINE TARGET | SIGHT LINE START TIME | RECEIVED SIGHT LINE VALUE |
|---|---|---|---|
| USER A | MATERIAL (p5) | HH:MM:SS | 0 |
| USER B | MATERIAL (p3) | HH:MM:SS | 1.2 |
| USER C | USER D | HH:MM:SS | 2.5 |
| USER D | USER C | HH:MM:SS | 1.5 |
| USER E | USER B | HH:MM:SS | 0 |
| USER F | USER C | HH:MM:SS | 0 |

FIG. 6

| USER | SPEECH RATIO |
|---|---|
| USER A | 40% |
| USER B | 50% |
| USER C | 0% |
| USER D | 20% |
| USER E | 30% |
| USER F | 0% |

| USER | ROLE | MANAGEMENT POSITION |
|---|---|---|
| USER A | PRESENTER | STAFF MEMBER |
| USER B | MODERATOR | STAFF MEMBER |
| USER C | | DEPARTMENT MANAGER |
| USER D | | SECTION CHIEF |
| USER E | | CHIEF |
| USER F | | STAFF MEMBER |

*FIG. 9*

| ROLE/MANAGEMENT POSITION | WEIGHT |
|---|---|
| ROLE | |
| PRESENTER | x1.5 |
| MODERATOR | x1.2 |
| PARTICIPANT | x1 |
| MANAGEMENT POSITION | |
| DEPARTMENT MANAGER | x2 |
| SECTION CHIEF | x1.5 |
| CHIEF | x1.2 |
| STAFF MEMBER | x1 |

MANAGEMENT SYSTEM CAPABLE OF REALIZING SMOOTH INTERACTIVE COMMUNICATION IN VIRTUAL SPACE, CONTROL METHOD, AND STORAGE MEDIUM

BACKGROUND OF THE INVENTION

Field of the Invention

The present invention relates to a management system that is capable of realizing smooth interactive communication in a virtual space, a control method, and a storage medium.

Description of the Related Art

A metaverse in which a plurality of users perform interactive communication in a virtual space on the Internet is attracting attention. In the virtual space of the metaverse, it is general to perform interactive communication by using an avatar as a body representing a user. In recent years, as a result of development of technology, it is possible to reflect a posture and a line of sight of a user wearing a Head Mount Display (HMD) as a device which makes it possible to access a virtual space, on a posture and a line of sight of the user's avatar in the virtual space. Therefore, even in the virtual space, communication taking a line of sight of a conversation partner into consideration is desired, similar to conversation in a real space.

For example, Published Japanese Translation of PCT Internal Publication (Tokuhyo) No. 2022-515978 describes a system that promotes conversation by notifying a user of a line of sight of a conversation partner, using the display of an icon.

However, in the above-mentioned technique disclosed in Published Japanese Translation of PCT Internal Publication (Tokuhyo) No. 2022-515978, the user can only be aware that the conversation partner is looking at him/her. In general, the meaning of the line of sight changes depending on a situation of conversation, and hence even when the user is aware that the conversation partner is looking at him/her, how the user reacts to this depends on how the user feels about this fact, and there is a case where the user cannot properly react as performed in a conversation in the real space. Further, in the above-described technique disclosed in Published Japanese Translation of PCT Internal Publication (Tokuhyo) No. 2022-515978, the user cannot notice a line of sight of an avatar existing outside his/her visual field, and hence the user cannot properly react to the line of sight of the avatar existing outside his/her visual field as performed in a conversation in the real space. Thus, conventionally, it is sometimes impossible to realize smooth interactive communication in the virtual space.

SUMMARY OF THE INVENTION

The present invention provides a management system that is capable of realizing smooth interactive communication in a virtual space, a control method, and a storage medium.

In a first aspect of the present invention, there is provided a management system that provides virtual space contents in which a plurality of users can participate, including one or more processors and/or circuitry configured to: execute processing for acquiring information on a line of sight of each user in a virtual space, who participates in the virtual space contents, execute processing for acquiring information on a speech of each user in the virtual space, who participates in the virtual space contents, execute processing for determining a conversation status between users in the virtual space, based on the information on the speech, and execute processing for providing a notification for assisting a user participating in the virtual space contents in promotion of conversation based on the information on the line of sight and the conversation status.

In a second aspect of the present invention, there is provided a control method for providing virtual space contents in which a plurality of users can participate, including acquiring information on a line of sight of each user in a virtual space, who participates in the virtual space contents, acquiring information on a speech of each user in the virtual space, who participates in the virtual space contents, determining a conversation status between users in the virtual space, based on the information on the speech, and executing processing for providing a notification for assisting a user participating in the virtual space contents in promotion of conversation based on the information on the line of sight and the conversation status.

According to the present invention, it is possible to realize smooth interactive communication in a virtual space.

Further features of the present invention will become apparent from the following description of exemplary embodiments (with reference to the attached drawings).

BRIEF DESCRIPTION OF THE DRAWINGS

FIG. 5 is a diagram showing an example of a sight line information table managed by the information processing apparatus appearing in FIG. 1.

FIG. 6 is a diagram showing an example of a speech information table managed by the information processing apparatus appearing in FIG. 1.

FIG. 8 is a diagram showing an example of a user information table managed by the information processing apparatus appearing in FIG. 1.

FIG. 9 is a diagram showing an example of a sight line-based weights table managed by the information processing apparatus appearing in FIG. 1.

DESCRIPTION OF THE EMBODIMENTS

Figure 1:
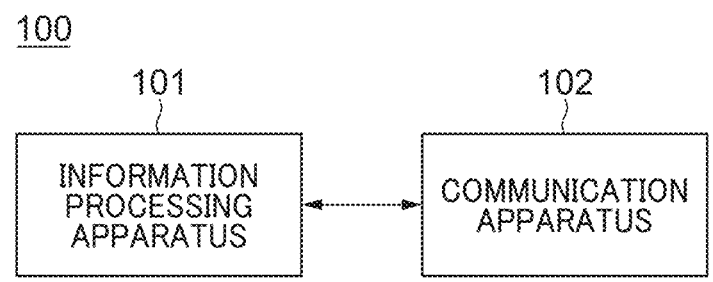
FIG. 1 is a block diagram schematically showing a configuration of a management system according to the present embodiment.

The present invention will now be described in detail below with reference to the accompanying drawings showing embodiments thereof. The present invention is not limited to the embodiments described below, and not all combinations of features described in the embodiments are absolutely essential to the solution of the invention. The configurations of the following embodiments can be corrected or changed as appropriate according to the specifications of an apparatus to which the present invention is applied and a variety of conditions (such as use conditions and a use environment). Further, components of the embodiments described below can be combined as appropriate. Note that in the following embodiments, the same components are denoted by the same reference numerals.

FIG. 1 is a block diagram schematically showing a configuration of a management system 100 according to the present embodiment. Referring to FIG. 1, the management system 100 includes an information processing apparatus 101 and a communication apparatus 102.

The management system 100 provides virtual experience contents that enable a user to experience a virtual space, such as a metaverse space. In this virtual experience contents, a plurality of users can participate. The information processing apparatus 101 is a physical server that manages a variety of data related to the virtual experience contents. The communication apparatus 102 is a personal computer (PC) or the like operated by a user who participates in the virtual experience contents. A HMD 220, described hereinafter with reference to FIG. 2B, worn by the user is connected to the communication apparatus 102.

In the present embodiment, when the user accesses the information processing apparatus 101 by operating the communication apparatus 102, the user can participate in the virtual experience contents provided by the information processing apparatus 101. When the user participates in the virtual experience contents, an image of a VR meeting, for example, is displayed on a display section 224 of the HMD 220, described hereinafter with reference to FIG. 2B, which is worn by the user. The image of the VR meeting includes avatars operated by other users participating in the VR meeting and virtual objects, such as a white board on which a presentation material is projected. In the following description, the users participating in the VR meeting are collectively referred to as the "VR meeting participant users". Note that although FIG. 1 shows the configuration of the management system 100 including only one communication apparatus 102 by way of example, the communication apparatuses 102 corresponding in number to the users participating in the virtual experience contents are included in the management system 100. For example, in a case where six users are participating in the virtual experience contents, six communication apparatuses 102 operated by these users, respectively, are included in the management system 100.

Figure 2A:
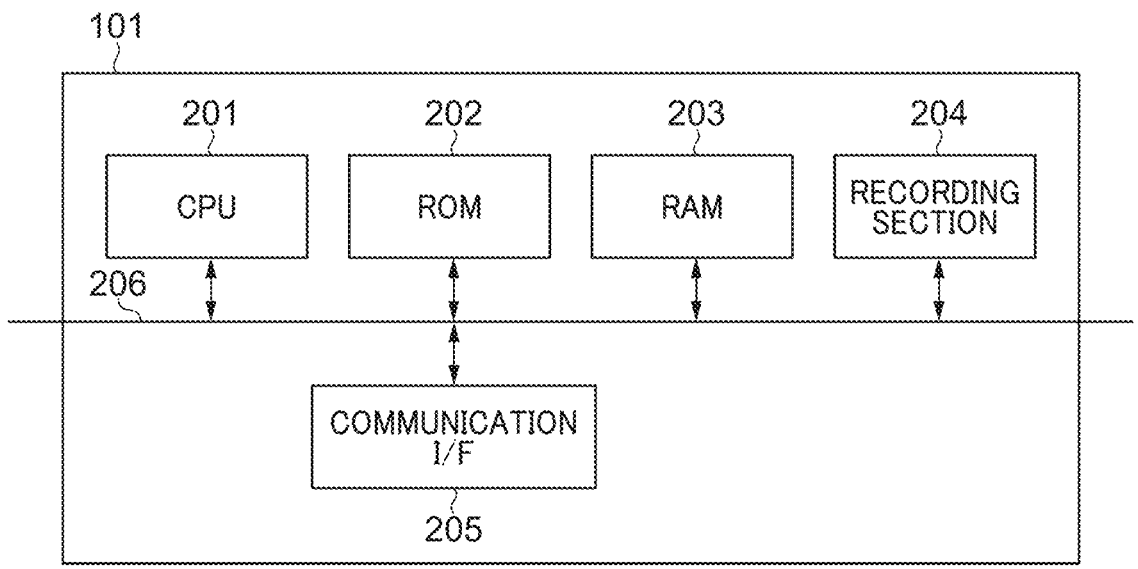
FIGS. 2A and 2B are block diagrams schematically showing respective hardware configurations of an information processing apparatus and a communication apparatus included in the management system shown in FIG. 1.
Figure 2B:
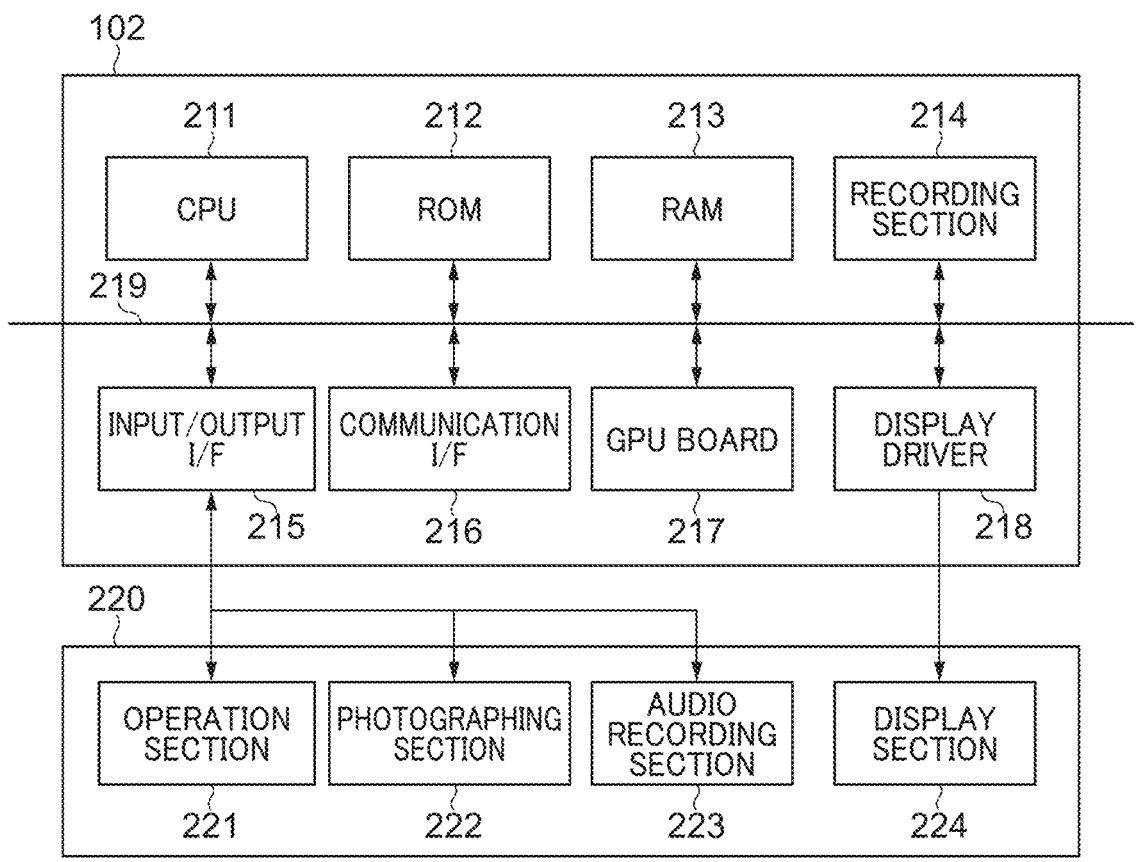

FIGS. 2A and 2B are block diagrams schematically showing hardware configurations of the information processing apparatus 101 and the communication apparatus 102, respectively, which are included in the management system 100 shown in FIG. 1. FIG. 2A shows the hardware configuration of the information processing apparatus 101 appearing in FIG. 1. Referring to FIG. 2A, the information processing apparatus 101 includes a central processing unit (CPU) 201, a read only memory (ROM) 202, a random access memory (RAM) 203, a recording section 204, and a communication interface (I/F) 205. These are interconnected via a bus 206.

The CPU 201 is a system controller and controls the overall operation of the information processing apparatus 101. Further, the CPU 201 realizes processes, described hereinafter with reference to FIGS. 14 to 17, for example, by executing respective associated information processing programs stored in the recording section 204.

The ROM 202 is a memory dedicated to storing programs and parameters, which do not need to be changed, such as a basic program and initial data. The RAM 203 is a memory for temporarily storing input information, calculation results obtained in a variety of processing operations, and so forth.

The recording section 204 is a device into and from which various types of information can be written and read. The recording section 204 is e.g. a hard disk or a memory card, which is incorporated in or externally attached to the information processing apparatus 101, or a memory card, a flexible disk, an integrated circuit (IC) card or the like, which is removably attached to the information processing apparatus 101. The information processing programs according to the present embodiment are each stored in the recording section 204, read from the recording section 204, loaded into the RAM 203, and executed by the CPU 201. Note that the information processing programs can be stored in the ROM 202.

The communication I/F 205 is an interface section that is capable of transmitting and receiving data to and from the communication apparatus 102 or the like operated by a user participating in the virtual experience contents. For example, the communication I/F 205 can receive, from the communication apparatus 102, audio data acquired by a microphone of the HMD 220 connected to the communication apparatus 102, position and posture information of the user wearing the HMD 220, and so forth.

Note that although in the present embodiment, the physical server is described as an example of the information processing apparatus 101, the information processing apparatus 101 can be a virtual server constructed on the Internet, i.e. a so-called cloud server.

FIG. 2B shows the hardware configuration of the communication apparatus 102 appearing in FIG. 1. Referring to FIG. 2B, the communication apparatus 102 includes a CPU 211, a ROM 212, a RAM 213, a recording section 214, an input/output I/F 215, a communication I/F 216, a graphics processing unit (GPU) board 217, and a display driver 218. These are interconnected via a bus 219. The HMD 220 is connected to the communication apparatus 102.

The CPU 211 is a system controller and controls the overall operation of the communication apparatus 102. The ROM 212 is a memory dedicated to storing programs and parameters, which do not need to be changed, such as a basic program and initial data, for reading therefrom. The RAM 213 is a memory for temporarily storing input information, calculation results obtained in a variety of processing operations, and so forth.

The recording section 214 is a device into and from which various types of information can be written and read. The recording section 214 is e.g. a hard disk or memory card incorporated in or externally attached to the communication apparatus 102, or a memory card, a flexible disk, an IC card or the like, which can be removably attached to the communication apparatus 102. Further, the recording section 214 records information indicating an instruction input to an operation section 221 by the user.

The input/output I/F 215 acquires data from the operation section 221 and the HMD 220, which are connected to the communication apparatus 102. For example, the input/output I/F 215 acquires information indicating an instruction input to the operation section 221 by the user from the operation section 221. Further, the input/output I/F 215 acquires captured image data generated through image capturing performed by an image capturing section 222 of the HMD 220, audio data recorded by an audio recording section 223 of the HMD 220, and so forth.

The communication I/F 216 is an interface section that is capable of transmitting and receiving data to and from the information processing apparatus 101 and the like. For example, the communication I/F 216 can receive audio data acquired by a microphone of a HMD worn by another user participating in the virtual experience contents, position and posture information of the user wearing the HMD, and so forth, via the information processing apparatus 101.

The GPU board 217 is a general-purpose graphic board and performs processing e.g. for generating and combining images. In the present embodiment, the GPU board 217 can perform processing for generating and combining images in which a plurality of avatars are arranged in the same virtual space. Note that an image generated as an image of a virtual object in advance can be recorded in the recording section 214.

The display driver 218 is software for controlling the display section 224 of the HMD 220 connected to the communication apparatus 102.

The HMD 220 includes the operation section 221, the image capturing section 222, the audio recording section 223, and the display section 224. The operation section 221 is, for example, a controller of the HMD 220 and is an operation device which can realize a pointing operation and an operation for inputting a variety of commands. The operation section 221 receives an instruction from a user. Note that the operation section 221 is not limited to the controller of the HMD 220 but can be an operation device comprised of a keyboard and a mouse, which is connected to the communication apparatus 102.

The image capturing section 222 is a camera device installed in the HMD 220. In the present embodiment, the communication apparatus 102 performs image recognition on a real video obtained through image capturing performed by the image capturing section 222 and identifies a position where a virtual object is superimposed. The audio recording section 223 is a microphone device installed in the HMD 220 and detects speech of a user. The display section 224 is an electronic display device, such as a liquid crystal display device, which is installed in the HMD 220.

Note that in the present embodiment, a configuration in which the HMD 220 performs communication with the information processing apparatus 101 via the communication apparatus 102 will be described, but this is not limitative. For example, in a case where the HMD 220 has a function of communicating with the information processing apparatus 101 and a function of generating and combining images in the virtual space, the HMD 220 can directly communicate with the information processing apparatus 101 without using the communication apparatus 102.

Figure 3:
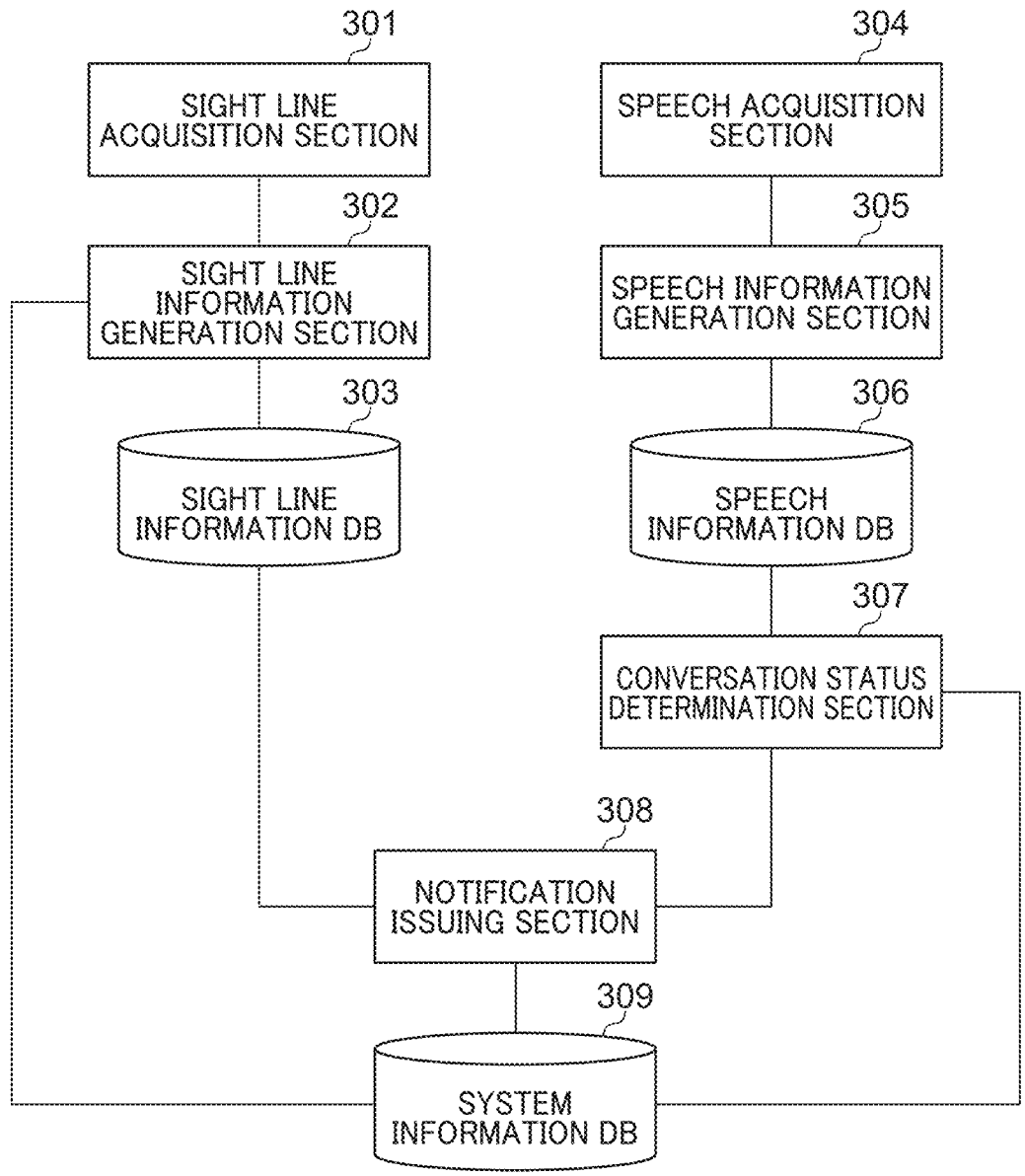
FIG. 3 is a block diagram schematically showing a functional configuration of the information processing apparatus appearing in FIG. 1.

FIG. 3 is a block diagram schematically showing a functional configuration of the information processing apparatus 101 appearing in FIG. 1. Referring to FIG. 3, the information processing apparatus 101 includes a sight line acquisition section 301, a sight line information generation section 302, a speech acquisition section 304, and a speech information generation section 305, as components of the functional configuration.

The sight line acquisition section 301 acquires information on a line of sight of a user operating the communication apparatus 102, i.e. a user in the virtual space, who wears the HMD 220 connected to the communication apparatus 102, from the communication apparatus 102. The sight line acquisition section 301 acquires the sight line information of users participating in the VR meeting from the plurality of communication apparatuses 102 operated by the users, respectively. In the present embodiment, the communication apparatus 102 can detect a line of sight at such a granularity at which it is possible to identify which one of virtual objects or avatars is being watched by a user wearing the HMD 220, and what page or section of the presentation material is being watched by a user in the virtual space. Note that the position of a line of sight of the user wearing the HMD 220, which is used for detecting a line of sight, can be set to the center of the image displayed on the HMD 220 or can be determined additionally providing a camera inside the HMD 220 and tracking the center of the pupil by the camera.

The sight line information generation section 302 generates sight line information based on the information on a sight of line, which is acquired by the sight line acquisition section 301. The sight line information includes a personal sight line information table 400 shown in FIG. 4 and a sight line information table 500 shown in FIG. 5. The personal sight line information table 400 is a table which shows what is set as a sight line target by a user per each unit time, and includes sight line targets and counts, as attributes. The personal sight line information table 400 is generated for each user participating in the VR meeting. The sight line information table 500 is a table collecting information on a line of sight of each user participating in the VR meeting and information on a line of sight turned to the user at a specific timing. The sight line information table 500 includes a user, a sight line target of the user, a start time at which the user has started to turn the line of sight to the target, and a received sight line value, as attributes. The received sight line value is an index relatively indicating how much the user is being watched by the other users in the VR meeting. Note that a method of calculating the received sight line value will be described hereinafter. The sight line information generated by the sight line information generation section 302 is registered in a sight line information database (DB) 303.

The speech acquisition section 304 acquires information on a user's speech detected based on the audio data acquired by the audio recording section 223 of the HMD 220 from the communication apparatus 102. The speech acquisition section 304 acquires the information on a user's speech from the plurality of communication apparatuses 102 operated by the users participating in the VR meeting, respectively. The communication apparatus 102 transmits waveform data based on the volume of a speech, as shown in a graph in FIG. 7, to the information processing apparatus 101 as the information on a user's speech. Note that although in the present embodiment, the description is given of a configuration in which the speech acquisition section 304 acquires the information on a user's speech detected by the communication apparatus 102, this is not limitative. For example, the speech acquisition section 304 can acquire the above-mentioned audio data from the communication apparatus 102 and detect a user's speech based on the acquired audio data.

Figure 7:
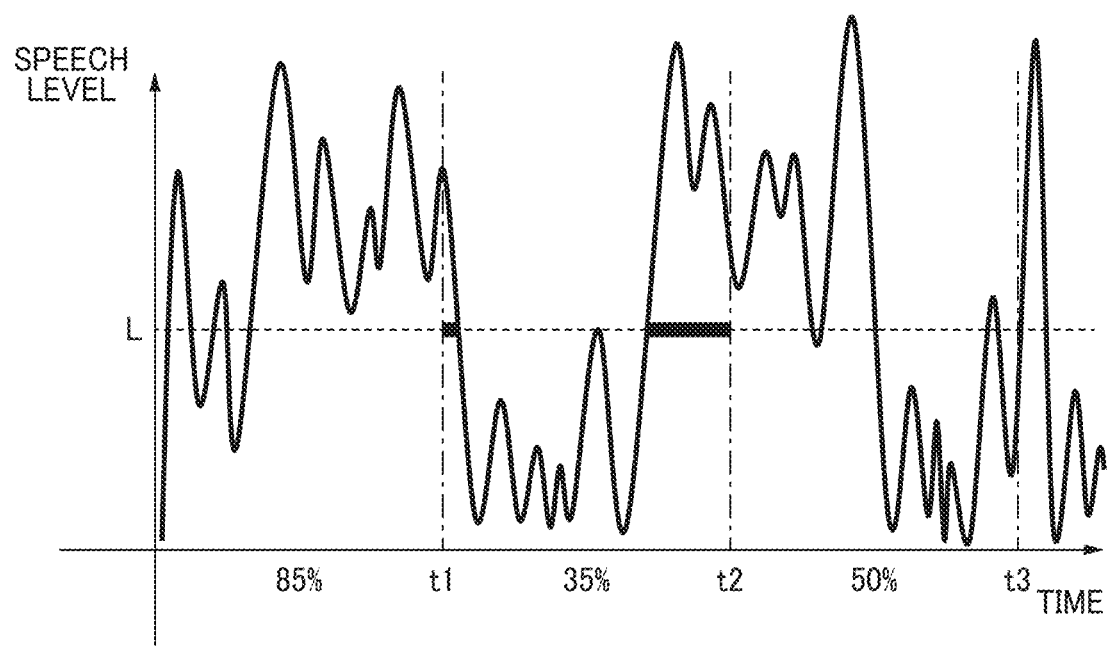
FIG. 7 is a diagram showing an example of data indicating a speaking state acquired from the communication apparatus appearing in FIG. 1.

The speech information generation section 305 generates speech information based on the information on a speech, which is acquired by the speech acquisition section 304. The speech information is stored in a speech information table 600 shown in FIG. 6. The speech information table 600 is registered in a speech information DB 306. The speech information table 600 is a table which collects a speech ratio per unit time of each user participating in the VR meeting, and includes a user and a speech ratio, as attributes. The speech ratio indicates a ratio of a time period in which the speech level is equal to or higher than a threshold value, to a predetermined unit time. Referring to FIGS. 7, t1, t2, and t3 indicate timings of measuring a speech ratio, which are set at equal intervals based on the unit time, and L indicates a threshold value for regarding a user as speaking in a case where the speech level exceeds the threshold value L. For example, in a case where a speech ratio in a time period from t1 to t2 is calculated, a ratio of a time period (part indicated by a solid line) in which the speech level exceeds the threshold value L, between t1 and t2, to the unit time (time period from t1 to t2), is calculated as the speech ratio. For example, in a case where the time in which the speech level exceeds the threshold value L in the time period from t1 to t2 is 35 seconds and the unit time (time period from t1 to t2) is 100 seconds, a value obtained by dividing 35 by 100 is multiplied by 100, with a result that 35% is obtained as the speech ratio. The speech ratio is independently calculated by using this method for each user participating in the VR meeting, and hence the sum of the speech ratios is not equal to 100%.

A conversation status determination section 307 determines a conversation status based on the speech information table 600. For example, in the VR meeting, the conversation status is represented by a discrimination value indicating a status of conversation, such as presenting/discussing/stagnating/other. Note that although in the present embodiment, the description is given of a configuration in which the conversation status is determined only based on the speech information table 600, this is not limitative. For example, the sight line information can be learned and used for reinforcing the determination of the conversation status.

A notification issuing section 308 issues a notification for assisting a user in promotion of conversation, based on the sight line information registered in the sight line information DB 303, the conversation status determined by the conversation status determination section 307, and system information registered in a system information DB 309. The system information includes a user information table 800 shown in FIG. 8 and a sight line-based weights table 900 shown in FIG. 9. The user information table 800 is a table which collects a role and a management position in the conversation of each user participating in the VR meeting, and includes a user, a role, and a management position, as attributes. The sight line-based weights table 900 is a table indicating the magnification of a weight for a line of sight, which is set according to a role/management position, and includes a role/management position and a weight, as attributes.

Next, the control of the information processing apparatus 101 in a case where a plurality users A to F each wear a HMD having the same function and configuration as the HMD 220 and participate in the VR meeting will be described. To each of the HMDs, the communication apparatus having the same function and configuration as the communication apparatus 102 is connected, and the information processing apparatus 101 acquires the sight line information of the users and the information on speeches of the users, from the plurality of communication apparatuses, respectively.

Figure 10:
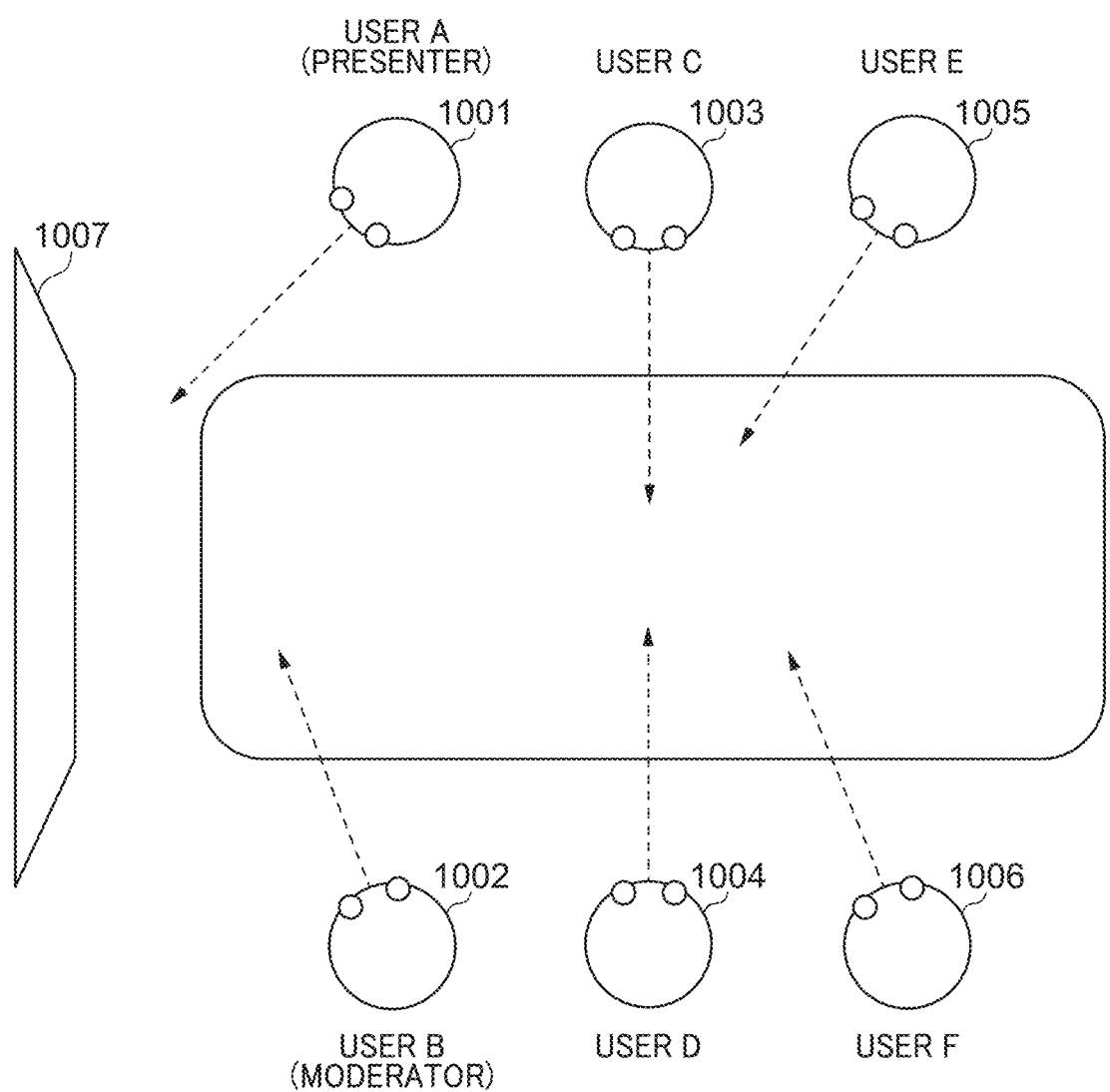
FIG. 10 is an image diagram of a virtual space of a virtual reality (VR) meeting as viewed from the above.

FIG. 10 is an image diagram of the virtual space of the VR meeting as viewed from the above. In the virtual space shown in FIG. 10, avatars 1001 to 1006 and a virtual object 1007 are included.

The avatar 1001 is an avatar of the user A as a presenter. The avatar 1002 is an avatar of the user B as a moderator. The avatars 1003 to 1006 are avatars of the users C to F participating in the VR meeting, respectively. The virtual object 1007 is a virtual object of a white board.

Figure 11:
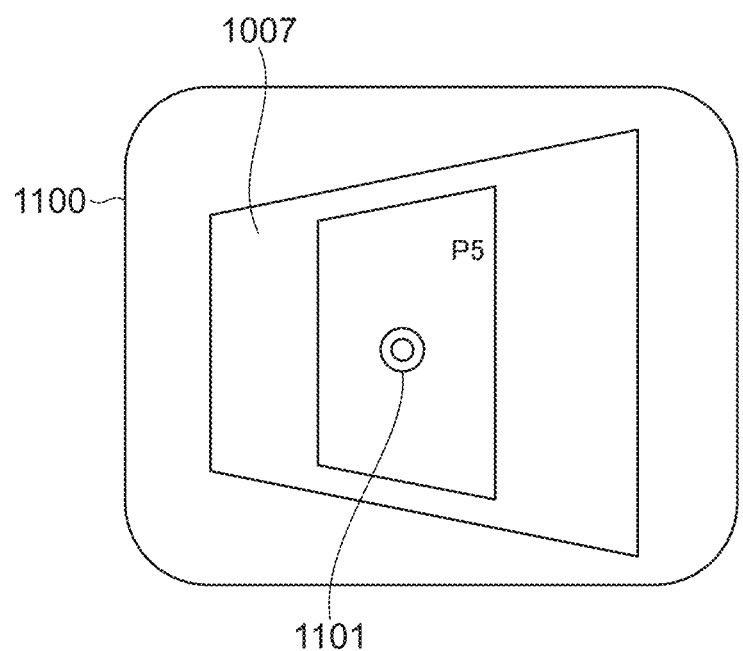
FIG. 11 is a diagram showing a visual field image of a user A appearing in FIG. 10.
Figure 12:
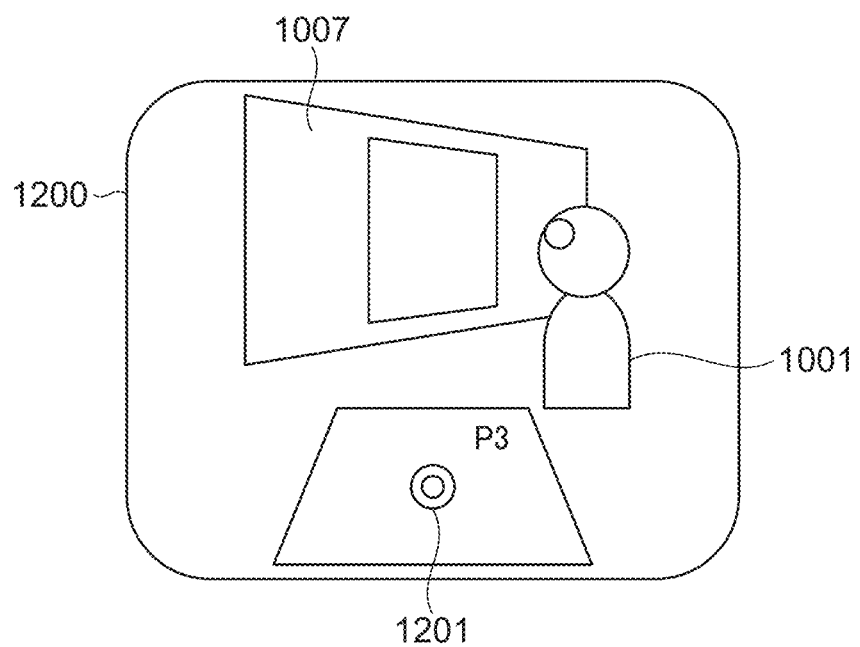
FIG. 12 is a diagram showing a visual field image of a user B appearing in FIG. 10.
Figure 13:
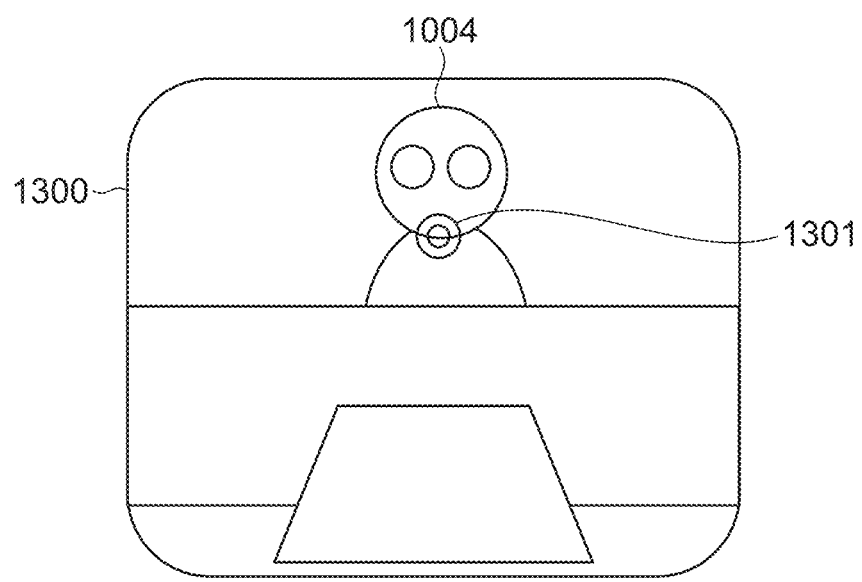
FIG. 13 is a diagram showing a visual field image of a user C appearing in FIG. 10.

Referring to FIG. 10, the avatar 1001 of the user A as the presenter is performing explanation while indicating a presentation material displayed on the virtual object 1007 of the white board. In FIG. 10, an arrow indicated by a dotted line extending from each avatar represents a direction of the line of sight of the user corresponding to each avatar. In this situation, for example, a visual field image of the user A corresponding to the avatar 1001 in the virtual space shown in FIG. 10 is an image 1100 shown in FIG. 11. A visual field image of the user B corresponding to the avatar 1002 is an image 1200 shown in FIG. 12. A visual field image of the user C corresponding to the avatar 1003 is an image 1300 shown in FIG. 13.

Figure 14:
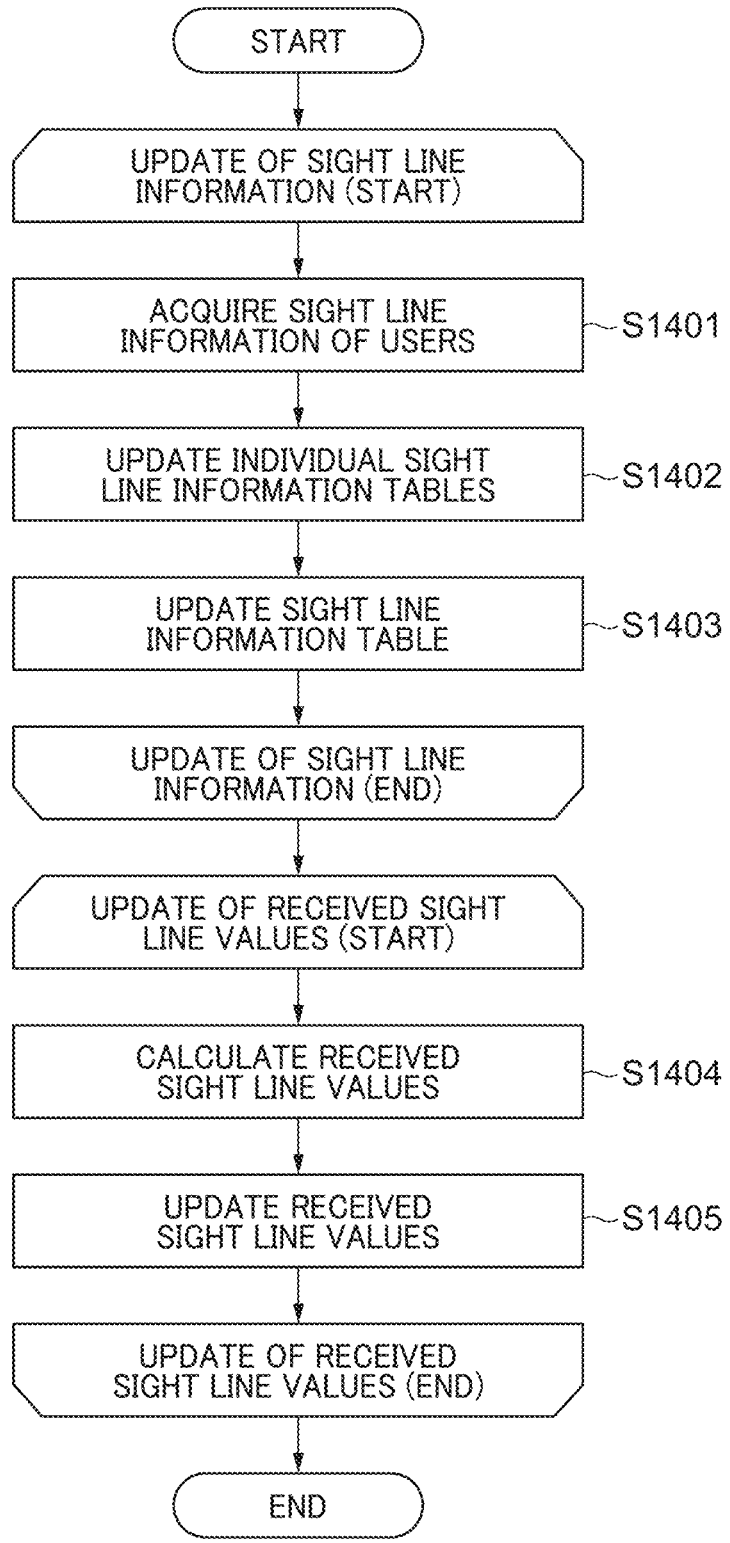
FIG. 14 is a flowchart of a sight line information generation process performed by the information processing apparatus appearing in FIG. 1.

FIG. 14 is a flowchart of a sight line information generation process performed by the information processing apparatus 101 appearing in FIG. 1. The sight line information generation process is realized by the CPU 201 that executes an associated information processing program recorded in the recording section 204. The sight line information generation process can be periodically executed at specified time intervals or can be executed when an execution instruction is received from a user.

Referring to FIG. 14, the CPU 201 updates the sight line information. Specifically, the CPU 201 execute steps S1401 to S1403.

In the step S1401, the CPU 201 acquires information on lines of sight of the users A to F in the virtual space from the plurality of communication apparatuses operated by the users A to F, respectively. Here, a pointer 1101 appearing in FIG. 11 indicates the line of sight of the user A. For example, the CPU 201 acquires information indicating that the user A is watching the fifth page of the presentation material displayed on the virtual object 1007 of the white board, from the communication apparatus operated by the user A in the step S1401. Further, a pointer 1201 appearing in FIG. 12 indicates the line of sight of the user B. For example, the CPU 201 acquires information indicating that the user B is watching the third page of the presentation material at hand from the communication apparatus operated by the user B in the step S1401. Further, a pointer 1301 appearing in FIG. 13 indicates the line of sight of the user C. For example, the CPU 201 acquires information indicating that the user C is watching the avatar 1004 of the user D, from the communication apparatus operated by the user C in the step S1401. Note that a pointer can be displayed on the display section 224 in a shape which enables identification of a user whose line of sight is indicated by the pointer, or the pointer can be not required to be displayed on the display section 224.

Figure 4:
FIG. 4 is a diagram showing an example of a personal sight line information table managed by the information processing apparatus appearing in FIG. 1.

In the step S1402, the CPU 201 updates the personal sight line information tables 400 based on the information of the lines of sight, which is acquired in the step S1401. Here, let it be assumed that the personal sight line information table 400 shown in FIG. 4 is the personal sight line information table 400 of the user A by way of example. In this case, the CPU 201 increments, by one, the count of "material: fifth page" in the personal sight line information table 400 of the user A, shown in FIG. 4, based on the information on the line of sight (information indicating that the user A is watching the fifth page of the presentation material), which is acquired from the communication apparatus operated by the user A. Further, the CPU 201 decrements the count of an item which has been incremented at the earliest time within the unit time. Thus, the sight line information is controlled such that the item of "material: fifth page" is a current attention object in the personal sight line information table 400. Similarly, the CPU 201 updates the personal sight line information tables 400 of the users B to F, respectively.

In the step S1403, the CPU 201 updates the sight line information table 500 based on the information on the lines of sight, which is acquired in the step S1401. For example, the CPU 201 updates the sight line target of the user A in the sight line information table 500 to the "material (P5)" based on the information on the line of sight (information indicating that the user A is watching the fifth page of the presentation material), which is acquired from the communication apparatus operated by the user A. Further, the CPU 201 updates the sight line start time of the user A in the sight line information table 500 to the current time. Similarly, the CPU 201 updates the information on the users B to F in the sight line information table 500.

The CPU 201 repeatedly executes the update of the sight line information (S1401 to S1403) e.g. until an instruction for terminating the VR meeting is received from a user participating in the VR meeting.

When the step S1403 is terminated, the CPU 201 updates the received sight line value. Specifically, the CPU 201 executes steps S1404 and S1405.

In the step S1404, the CPU 201 calculates the received sight line value of each user participating in the VR meeting based on the sight line information table 500. For example, it is identified based on the sight line information table 500 that the user D and the user F are each watching the user C as the sight line target. The weight set for the role (participant) of the user D is e.g. "1", and the weight set for the management position (section chief) of the user D is e.g. "1.5". Based on these values, the weighted sight line value of the user D is calculated by 1 (participant)×1.5 (section chief)=1.5. Further, the weight set for the role (participant) of the user F is e.g. "1", and the weight set for the management position (staff member) of the user F is e.g. "1". Based on these values, the weighted sight line value of the user F is calculated by 1 (participant)×1 (staff member) =1. The CPU 201 calculates "2.5" which is the sum of these values as the received sight line value of the user C. Similarly, the CPU 201 calculates the received sight line values of the users other than the user C.

In the step S1405, the CPU 201 updates the received sight line values in the sight line information table 500 to the received sight line values calculated in the step S1404.

The CPU 201 repeatedly executes the update of the received sight line values (S1404 and S1405) e.g. until an instruction for terminating the VR meeting is received from a user participating in the VR meeting. When this termination instruction is received, the CPU 201 terminates the sight line information generation process.

Figure 15:
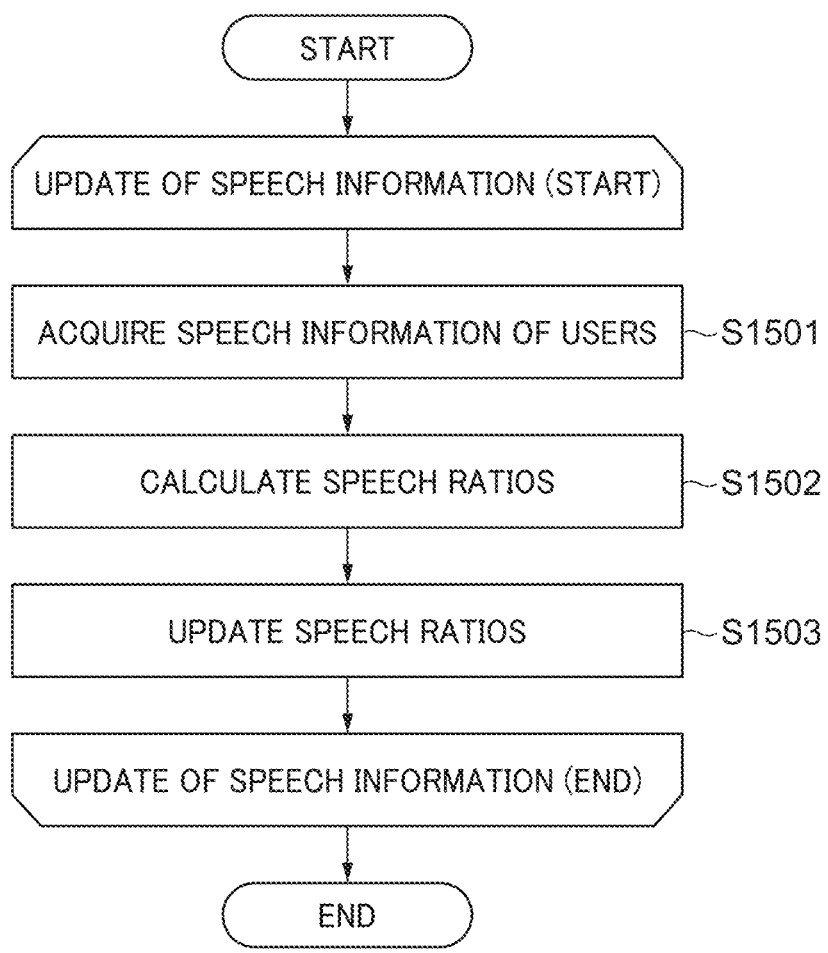
FIG. 15 is a flowchart of a speech information generation process performed by the information processing apparatus appearing in FIG. 1.

FIG. 15 is a flowchart of a speech information generation process performed by the information processing apparatus 101 appearing in FIG. 1. The speech information generation process is realized by the CPU 201 that executes an associated information processing program recorded in the recording section 204. The speech information generation process can be periodically executed at specified time intervals or executed when an execution instruction is received from a user.

Referring to FIG. 15, the CPU 201 updates the speech information. Specifically, the CPU 201 executes steps S1501 to S1503.

In the step S1501, the CPU 201 acquires the information on speeches of the users A to F in the virtual space from the plurality of communication apparatuses operated by the users A to F, respectively. In the step S1501, as described above, for example, the waveform data in the unit time as shown in FIG. 7 is acquired.

In the step S1502, the CPU 201 calculates, based on the speech information acquired in the step S1501, the speech ratio from the speech time per unit time, for each user participating in the VR meeting. For example, in a case where the waveform data shown in FIG. 7 has been recorded in the step S1501, and the step S1502 is executed at a timing of t3, "50%" is calculated as the speech ratio, which is a ratio of time between t2 and t3 in which the speech level exceeds the threshold value L per unit time (time from t2 to t3). Thus, the CPU 201 calculates the speech ratio with respect to each of the users A to F.

In the step S1503, the CPU 201 updates the speech ratio of each user in the speech information table 600 to the speech ratio calculated in the step S1502.

The CPU 201 repeatedly executes the update of the speech information (S1501 to S1503) e.g. until an instruction for terminating the VR meeting is received from a user participating in the VR meeting. When this termination instruction is received, the CPU 201 terminates the speech information generation process.

Figure 16:
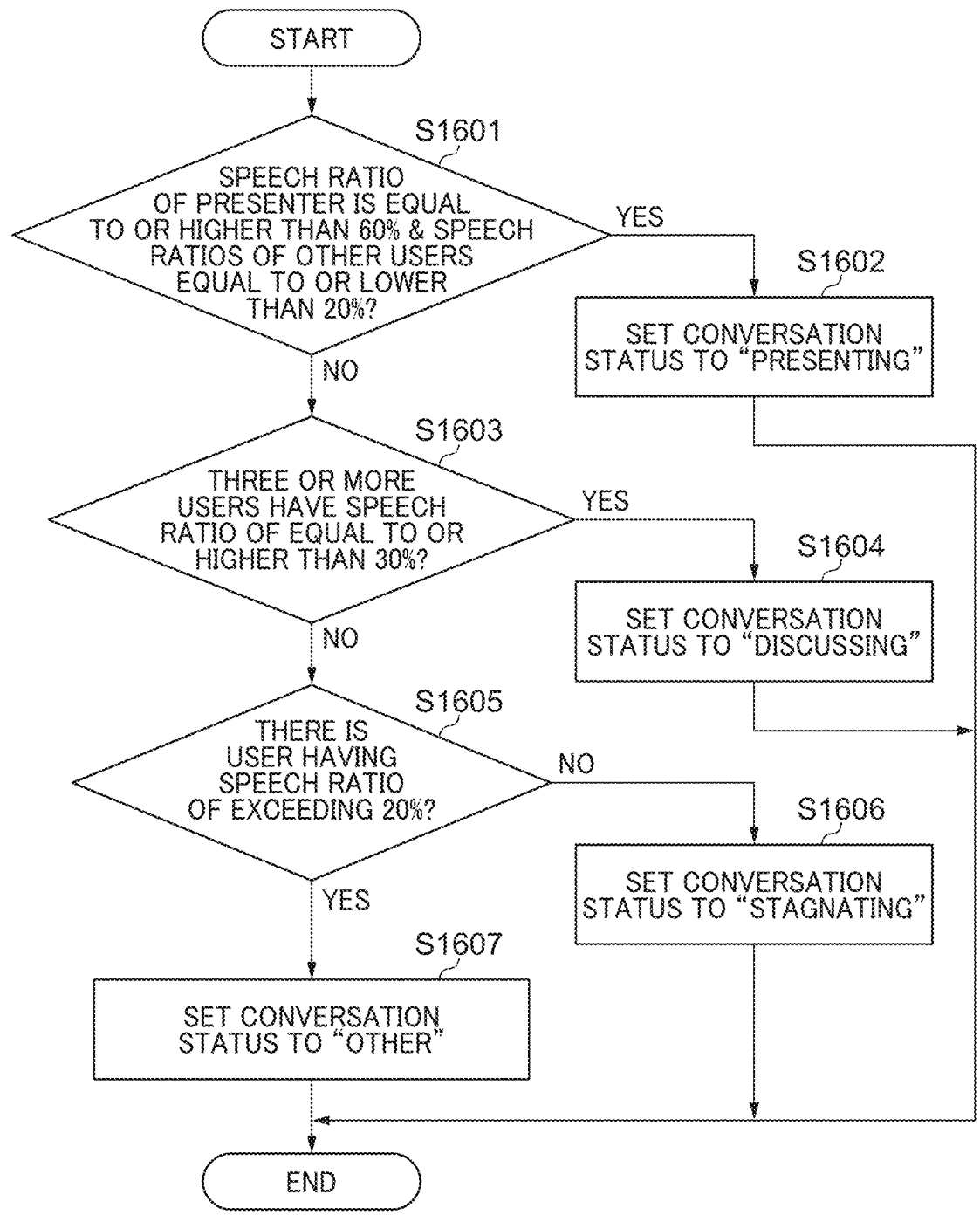
FIG. 16 is a flowchart of a conversation status determination process performed by the information processing apparatus appearing in FIG. 1.

FIG. 16 is a flowchart of a conversation status determination process performed by the information processing apparatus 101 appearing in FIG. 1. The conversation status determination process is realized by the CPU 201 that executes an associated information processing program recorded in the recording section 204. The conversation status determination process can be periodically executed at specified time intervals or executed when an execution instruction is received from a user. Note that determination conditions including threshold values, which are used in the conversation status determination process, are described, by way of example, and do not limit the application range of the present invention.

Referring to FIG. 16, the CPU 201 determines, based on the speech information table 600 and the user information table 800, whether or not the speech ratio of the user whose role is the presenter is equal to or higher than 60% and the speech ratios of the users other than the presenter are equal to or lower than 20% at the same time (S1601).

If it is determined in the step S1601 that the speech ratio of the user whose role is the presenter is equal to or higher than 60% and the speech ratios of the users other than the presenter are equal to or lower than 20% at the same time, the CPU 201 sets the conversation status to "presenting" (S1602). After that, the conversation status determination process is terminated.

If it is determined in the step S1601 that the speech ratio of the user whose role is the presenter is lower than 60% or the speech ratios of the users other than the presenter are higher than 20%, the conversation status determination process proceeds to a step S1603.

In the step S1603, the CPU 201 determines whether or not there are three or more users having a speech ratio of equal to or higher than 30%. If it is determined in the step S1603 that there are three or more users having a speech ratio of equal to or higher than 30%, the CPU 201 sets the conversation status to "discussing" (S1604). For example, in the speech information table 600 shown in FIG. 6, the speech ratio of the user A as the presenter is 40% which is lower than 60%, and there are three users (the users A, B, and E) each having a speech ratio of equal to or higher than 30%. In this case, the conversation status is set to "discussing". After that, the conversation status determination process is terminated.

If it is determined in the step S1603 that the number of users having a speech ratio of equal to or higher than 30% is less than three, the CPU 201 determines whether or not there is a user having a speech ratio of exceeding 20% (S1605). If it is determined in the step S1605 that there is no user having a speech ratio of exceeding 20%, the CPU 201 sets the conversation status to "stagnating" (S1606). After that, the conversation status determination process is terminated.

If it is determined in the step S1605 that there is a user having a speech ratio of exceeding 20%, the CPU 201 sets the conversation status to "other" (S1607). After that, the conversation status determination process is terminated.

Figure 17:
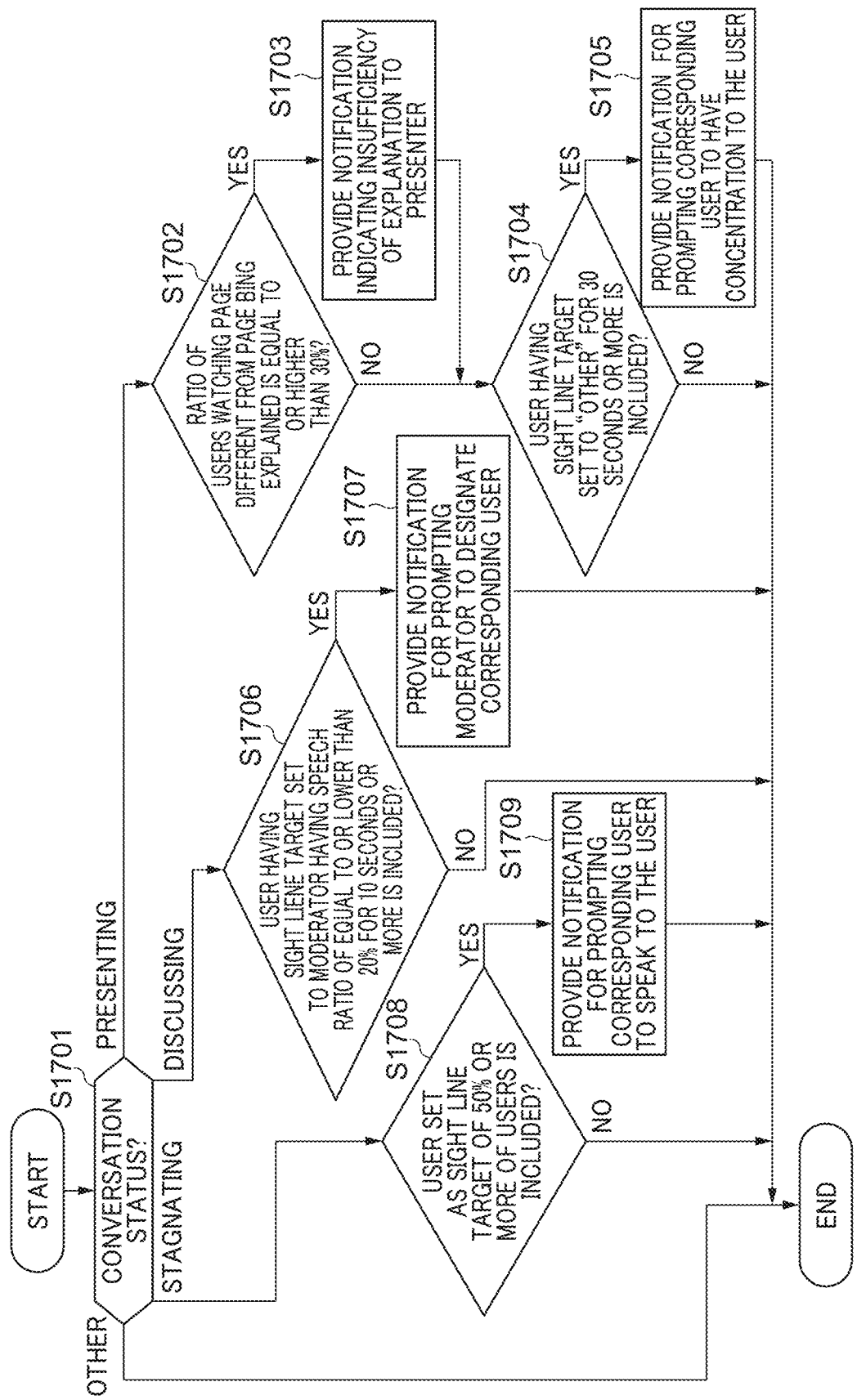
FIG. 17 is a flowchart of a notification control process performed by the information processing apparatus appearing in FIG. 1.

FIG. 17 is a flowchart of a notification control process performed by the information processing apparatus 101 appearing in FIG. 1. The notification control process is realized by the CPU 201 that executes an associated information processing program recorded in the recording section 204. The notification control process can be periodically executed at specified time intervals or executed when an execution instruction is received from a user. Note that determination conditions including threshold values, which are used in the notification control process, are described by way of example, and do not limit the application range of the present invention.

Referring to FIG. 17, first, the CPU 201 determines the conversation status set in the above-described conversation status determination process (S1701).

If it is determined in the step S1701 that the conversation status set in the above-described conversation status determination process is "presenting", the notification control process proceeds to a step S1702. In the step S1702, the CPU 201 determines whether or not a ratio of the number of users who are watching a page, as the sight line target, which is different from the page being explained by the user whose role is the presenter to the number of the users participating in the VR meeting is equal to or higher than a first ratio, e.g. 30%.

If it is determined in the step S1702 that the ratio of the number of users who are watching a pager, as the sight line target, which is different from the page being explained by the user whose role is the presenter to the number of the users participating in the VR meeting is equal to or higher than the first ratio, e.g. 30%, the notification control process proceeds to a step S1703.

Figure 18:
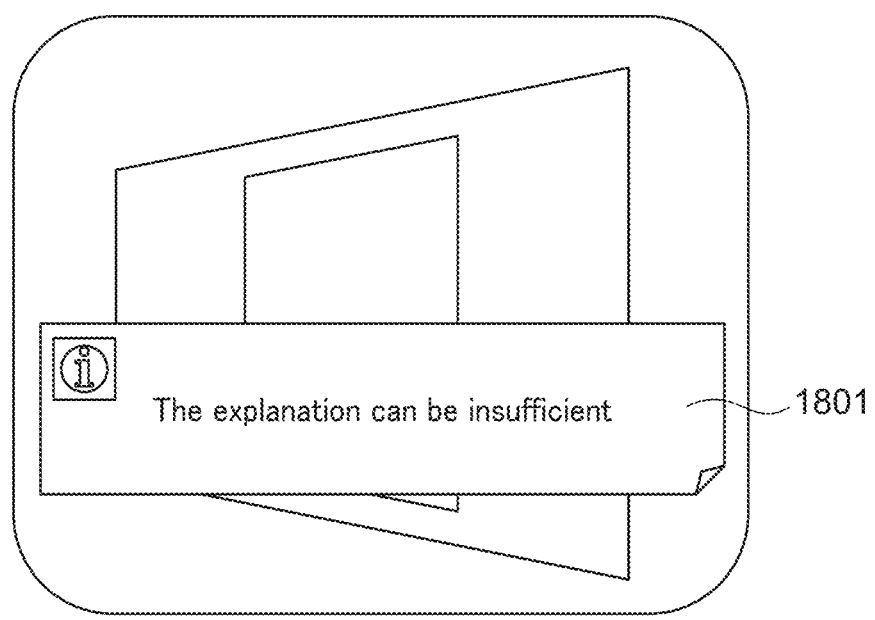
FIG. 18 is a diagram showing an example of a message displayed on a display section of a HMD appearing in FIG. 2B.

In the step S1703, the CPU 201 provides a notification to the effect that the explanation of the material is insufficient, to the user whose role is the presenter. Specifically, the CPU 201 issues an instruction for displaying a message 1801 shown in FIG. 18 on the display section of the HMD worn by the user whose role is the presenter, to the communication apparatus to which this HMD is connected, i.e. the communication apparatus operated by the user whose role is the presenter. The display section of the HMD connected to the communication apparatus having received this instruction displays the message 1801 to the effect that the explanation of the material, which has been performed so far, can be insufficient. When the step S1703 is completed, the notification control process proceeds to a step S1704.

Further, if it is determined in the step S1702 that the ratio of the number of users who are watching a page, as the sight line target, which is different from the page being explained by the user whose role is the presenter to the number of the users participating in the VR meeting is lower than the first ratio, e.g. 30%, the notification control process also proceeds to the step S1704.

In the step S1704, the CPU 201 determines whether or not the users participating in the VR meeting include a user whose sight line target has been set to "other" in the personal sight line information table 400 for a first time period, e.g. 30 seconds or more. Note that in the present embodiment, the sight line target of an avatar who is watching an object which corresponds to neither of an avatar of a participant user nor the presentation material is set to "other".

Figure 19:
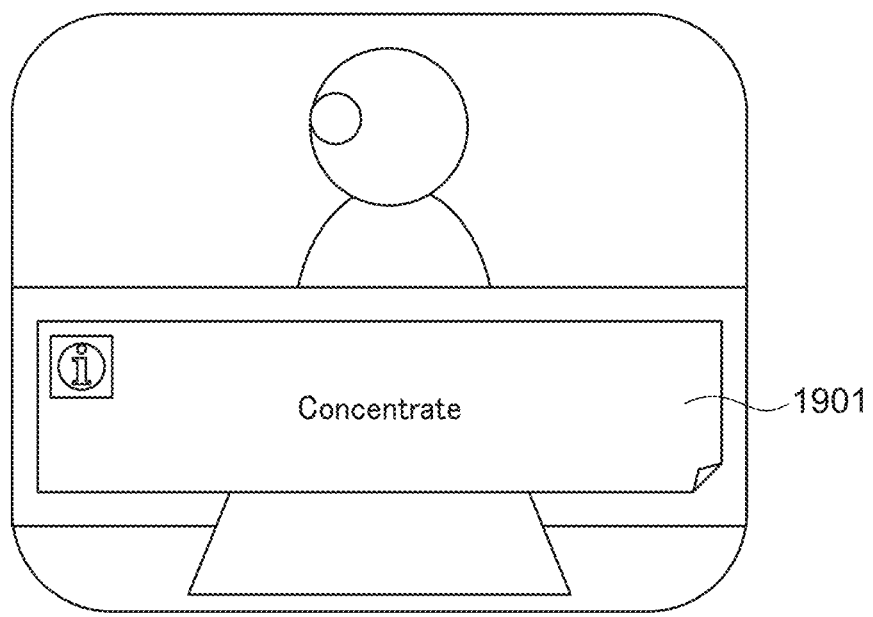
FIG. 19 is a diagram showing an example of a message displayed on the display section of the HMD appearing in FIG. 2B.

If it is determined in the step S1704 that the users participating in the VR meeting include a user whose sight line target has been set to "other" for the first time period, e.g. 30 seconds or more, the notification control process proceeds to a step S1705. In the step S1705, the CPU 201 provides a notification for prompting this user (described as the "corresponding user" in FIG. 17) to have concentration, to the user. Specifically, the CPU 201 issues an instruction for displaying a message 1901 shown in FIG. 19 on the display section of the HMD worn by this user to the communication apparatus to which this HMD is connected, i.e. the communication apparatus operated by this user. The display section of the HMD connected to the communication apparatus having received this instruction displays the message 1901 for prompting the user to have concentration. When the step S1705 is completed, the notification control process is terminated. Note that in a case where the users participating in the VR meeting include a plurality of users whose sight line target has been set to "other" for the first time period, e.g. 30 seconds or more, in the step S1705, an instruction for displaying a message for prompting a user to take a break can be transmitted to the communication apparatus operated by the user whose role is the moderator. A message for prompting a user to take a break is displayed on the display section of the HMD connected to the communication apparatus having received this instruction, i.e. the display section of the HMD worn by the user whose role is the moderator. On the other hand, if it is determined in the step S1704 that the users participating in the VR meeting include no user whose sight line target has been set to "other" for the first time period, e.g. 30 seconds or more, the notification control process is immediately terminated.

If it is determined in the step S1701 that the conversation status set in the above-described conversation status determination process is "discussing", the notification control process proceeds to a step S1706. In the step S1706, the CPU 201 determines whether or not the users participating in the VR meeting include a user who is watching the moderator, as the sight line target who has a speech ratio of equal to or lower than 20%, for 10 seconds or more.

If it is determined in the step S1706 that the users participating in the VR meeting include no user who is watching the moderator having a speech ratio of equal to or lower than 20% for 10 seconds or more, the notification control process is terminated.

Figure 20:
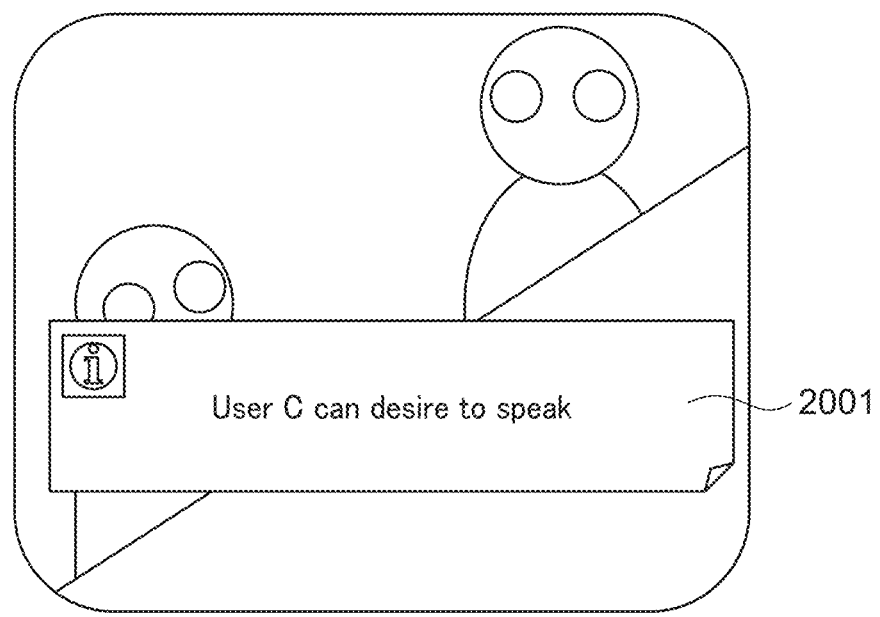
FIG. 20 is a diagram showing an example of a message displayed on the display section of the HMD appearing in FIG. 2B.

If it is determined in the step S1706 that the users participating in the VR meeting include a user who is watching the moderator, as the sight line target, who has a speech ratio of equal to or lower than 20%, for 10 seconds or more, the notification control process proceeds to a step S1707. In the step S1707, the CPU 201 provides a notification to the user whose role is the moderator, for prompting the user as the moderator to designate the user watching the moderator. Specifically, the CPU 201 issues an instruction for displaying a message 2001 shown in FIG. 20 on the display section of the HMD worn by the user whose role is the moderator, to the communication apparatus connected to the HMD, i.e. the communication apparatus operated by the user whose role is the moderator. On the display section of the HMD connected to the communication apparatus having received this instruction, the message 2001 is displayed for prompting the user as the moderator to designate the corresponding user (user who is watching the moderator, as the sight line target, who has a speech ratio of equal to or lower than 20% for 10 seconds or more). When the step S1707 is completed, the notification control process is terminated.

If it is determined in the step S1701 that the conversation status set in the above-described conversation status determination process is "stagnating", the notification control process proceeds to a step S1708. In the step S1708, the CPU 201 determines whether or not a user who is set as the sight line targets of equal to or higher than a second ratio, i.e. 50% or more of users participating in the VR meeting. If it is determined in the step S1708 that there is no user who is set as the sight line targets of equal to or higher than the second ratio e.g. 50% or more of the users participating in the VR meeting, the notification control process is terminated.

Figure 21:
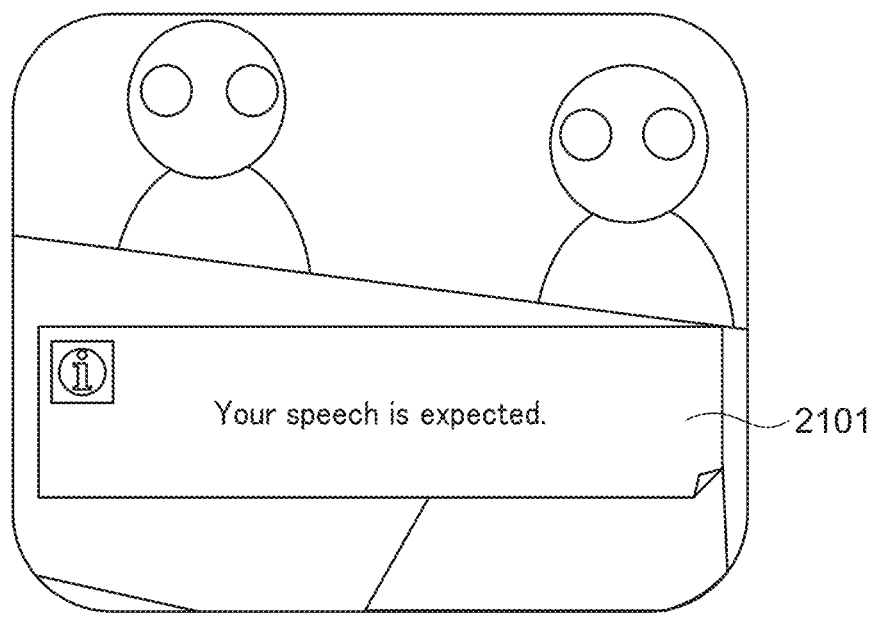
FIG. 21 is a diagram showing an example of a message displayed on the display section of the HMD appearing in FIG. 2B.

If it is determined in the step S1708 that there is a user who is set as the sight line targets of the users of equal to or higher than the second ratio, e.g. 50% or more of the users participating in the VR meeting, the CPU 201 provides a notification for prompting this user (described as the "corresponding user" in FIG. 17) to speak, to the user (S1709). Specifically, the CPU 201 issues an instruction for displaying a message 2101 shown in FIG. 21 on the display section of the HMD worn by the corresponding user to the communication apparatus to which the HMD is connected, i.e. the communication apparatus operated by the corresponding user. On the display section of the HMD connected to the communication apparatus having received this instruction, the message 2101 for prompting the user to speak is displayed. Note that in the present embodiment, in the step S1709, an instruction for displaying a message for prompting the user whose role is the moderator to designate the corresponding user (the user set as the sight line targets of 50% or more of users) as a speaker can be transmitted to the communication apparatus operated by the user whose role is the moderator. On the display section of the HMD connected to the communication apparatus having received this instruction, i.e. the display section of the HMD worn by the user whose role is the moderator, the message for prompting the user as the moderator to designate the corresponding user is displayed. When the step S1709 is completed, the notification control process is terminated. On the other hand, in the step S1701, if it is determined that the conversation status set in the above-described conversation status determination process is "other", the notification control process is immediately terminated.

According to the above-described embodiment, the notification for assisting a user participating in the VR meeting in promotion of conversation is provided based on the information on the line of sights of the users participating in the VR meeting and the conversation statuses of the users participating in the VR meeting. This makes it possible to realize smooth interactive communication in the virtual space.

Further, in the above-described embodiment, since the VR meeting is performed in the virtual space, it is possible to realize smooth interactive communication in the VR meeting.

Further, in the above-described embodiment, the sight line information includes information indicating, out of a plurality of avatars included in the virtual space, an avatar being watched by a user or users participating in the VR meeting. With this, it is possible to provide a proper notification for assisting each participant user in promotion of conversation. based on which of avatars is being watched by each user participating in the VR meeting.

Further, in the above-described embodiment, the sight line information includes information indicating a page or section of the presentation material being explained in the VR meeting, which is being watched by the user participating in the VR meeting. With this, it is possible to provide a proper notification for assisting each participant user in promotion of conversation based on which page or which section is being watched by each user participating in the VR meeting.

Further, in the above-described embodiment, the message 1901 for prompting a user watching neither the avatars included in the virtual space nor the presentation material, for the first time period, e.g. 30 seconds or more, to have concentration is displayed on the display section of the HMD worn by the user participating in the VR meeting,. With this, it is possible to correct the attitude of a user who lacks concentration with respect to participation in the meeting.

Further, in the above-described embodiment, the message 2101 for prompting a user to speak is displayed on the display section of the HMD worn by a user who is being watched by the second ratio, e.g. 50% or more of the users participating in the VR meeting. With this, it is possible to prompt the user being watched by a lot of participant users to speak and thereby prevent stagnation of discussion.

Further, in the above-described embodiment, in a case where the first ratio, e.g. 30% or more of the users participating in the VR meeting are watching a page different from a page being explained by the presenter, the message 1801 indicating that the explanation is insufficient is displayed on the display section of the HMD worn by the presenter. With this, it is possible to make the presenter notice that the explanation is insufficient.

Note that although in the above-described embodiment, the description has been given of the VR meeting in the metaverse space as the example of interactive communication, the present invention is applied not only to the VR meeting but can be applied to all interactive communication in the virtual space.

Further, the description of the embodiments described above is given by way of example, but not intended to limit the scope of the present invention, but it can be practiced in various forms, without departing from the spirit and scope thereof.

Note that in this system, for example, even in a case where an information processing apparatus exists outside Japan, and a communication apparatus exists within Japan, each file or data can be transmitted from the information processing apparatus to the communication apparatus, and the communication apparatus can receive the file or data. Thus, even in the case where the information processing apparatus exists outside Japan, transmission and reception (transmission/reception) of a file or data in this system are integrally performed, i.e. performed without an additional operation performed by a user of the communication apparatus. Further, since the system functions according to reception of each file or data by the communication apparatus existing within Japan, it is possible to consider that the transmission/reception are performed within Japan.

Further, in this system, for example, even in a case where an information processing apparatus exists outside Japan, and a communication apparatus exists within Japan, the communication apparatus can perform the main function of this system (function of displaying a notification (message) for assisting users in promotion of conversation between users in a virtual space), and further, can exhibit the effect obtained by this function (effect of realizing smooth interactive communication in a virtual space) within Japan.

Further, for example, even when an information processing apparatus exists outside Japan, only if a communication apparatus as a component of this system exists within Japan, it is possible to use this system inside Japan by using this communication apparatus. Further, the use of this system can affect economic benefits e.g. for the patent owner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-195829 filed Nov. 17, 2023, which is hereby incorporated by reference herein in its entirety.

What is claimed is:

1. A management system that provides a virtual reality meeting in which a plurality of users can participate, comprising one or more processors and/or circuitry configured to:

execute processing for acquiring information on a line of sight of each user in a virtual space, who participates in the virtual reality meeting; and execute processing for providing a notification to a user participating in the virtual reality meeting based on the information on the line of sight, wherein the processing for providing the notification includes issuing an instruction for displaying a message for prompting a user being watched by a predetermined ratio or more of a plurality of users participating in the virtual reality meeting to speak, on a wearable display device worn by the user being watched, to a communication apparatus to which the wearable display device is connected.

2. The management system according to claim 1, wherein the information on the line of sight includes information indicating, out of a plurality of avatars included in the virtual space, an avatar being watched by a user participating in the virtual reality meeting.

3. The management system according to claim 1, wherein the information on the line of sight includes information indicating a page or section, which is being watched by a user participating in the virtual reality meeting, of a presentation material being explained in the virtual reality meeting.

4. The management system according to claim 3, wherein the processing for providing a notification includes issuing an instruction for displaying a message for prompting a user to concentrate on a wearable display device worn by the user who, out of a plurality of users participating in the virtual reality meeting, has watched neither an avatar nor the presentation material included in the virtual reality meeting, for a predetermined time period, to a communication apparatus to which the wearable display device is connected.

5. The management system according to claim 1, wherein the processing for providing a notification includes issuing an instruction for displaying a message for prompting a moderator of the virtual reality meeting to designate a user being watched by a predetermined ratio or more of a plurality of users participating in the virtual reality meeting, on a wearable display device worn by the moderator of the virtual reality meeting, to a communication apparatus to which this wearable display device is connected.

6. The management system according to claim 1, wherein the processing for providing a notification includes issuing, in a case where a predetermined ratio or more of a plurality of users participating in the virtual reality meeting are watching a page different from a page being explained by a presenter of the virtual reality meeting, an instruction for displaying a message to the effect that the explanation is insufficient, on a wearable display device worn by the presenter, to a communication apparatus to which the wearable display device is connected.

7. The management system according to claim 1, wherein the one or more processors and/or circuitry is further configured to:
execute processing for acquiring information on a speech of each user in the virtual space, who participates in the virtual reality meeting; and
execute processing for determining a conversation status between users in the virtual space, based on the information on the speech,
wherein the processing for providing the notification includes issuing the notification to the user participating in the virtual reality meeting based on the information on the line of sight and the conversation status.

8. The management system according to claim 7, wherein in the processing for determining includes determining a conversation status based on speech ratios of users participating in the virtual reality meeting.

9. A control method for providing a virtual reality meeting in which a plurality of users can participate, comprising:
acquiring information on a line of sight of each user in a virtual space, who participates in the virtual reality meeting; and
executing processing for providing a notification to a user participating in the virtual reality meeting based on the information on the line of sight,
wherein the processing for providing the notification includes issuing an instruction for displaying a message for prompting a user being watched by a predetermined ratio or more of a plurality of users participating in the virtual reality meeting to speak, on a wearable display device worn by the user being watched, to a communication apparatus to which the wearable display device is connected.

10. A non-transitory computer-readable storage medium storing a program for causing a computer to execute a control method for providing a virtual reality meeting in which a plurality of users can participate,
wherein the method comprises:
acquiring information on a line of sight of each user in a virtual space, who participates in the virtual reality meeting; and
executing processing for providing a notification to a user participating in the virtual reality meeting based on the information on the line of sight,
wherein the processing for providing the notification includes issuing an instruction for displaying a message for prompting a user being watched by a predetermined ratio or more of a plurality of users participating in the virtual reality meeting to speak, on a wearable display device worn by the user being watched, to a communication apparatus to which the wearable display device is connected.

* * * * *